(12) United States Patent
Hwang et al.

(10) Patent No.: US 8,290,277 B2
(45) Date of Patent: Oct. 16, 2012

(54) METHOD AND APPARATUS FOR SETTING A LIP REGION FOR LIP READING

(75) Inventors: Seong-Taek Hwang, Pyeongtaek-si (KR); Jin-Young Kim, Gwangju (KR)

(73) Assignees: Samsung Electronics Co., Ltd. (KR); Industry Foundation of Chonnam National University (KR)

( * ) Notice: Subject to any disclaimer, the term of this patent is extended or adjusted under 35 U.S.C. 154(b) by 385 days.

(21) Appl. No.: 12/646,600

(22) Filed: Dec. 23, 2009

(65) Prior Publication Data

US 2010/0172587 A1    Jul. 8, 2010

(30) Foreign Application Priority Data

Jan. 2, 2009    (KR) ........................ 10-2009-0000124

(51) Int. Cl.
*G06K 9/46* (2006.01)
(52) U.S. Cl. ......... 382/190; 382/118; 382/254; 382/100
(58) Field of Classification Search .................. 382/190, 382/118, 254
See application file for complete search history.

(56) References Cited

U.S. PATENT DOCUMENTS

2008/0253651 A1* 10/2008 Sagawa .................. 382/167

FOREIGN PATENT DOCUMENTS

JP    2000-348173    12/2000
KR    100680278    2/2007

OTHER PUBLICATIONS

Furuyama, JP2000-348173-Eng, which is a english version of JP2000-348173 translated by machine.*
Jang Kyung Shik, "Pupil and Lip Detection using Shape and Weighted Vector based on Shape", Journal of the Korean Institute of Information Scientists and Engineers (KIISE): Software and Applications, vol. 29, No. 5, pp. 311-318, Jun. 2002.

* cited by examiner

*Primary Examiner* — Matthew Bella
*Assistant Examiner* — Ruiping Li
(74) *Attorney, Agent, or Firm* — The Farrell Law Firm, P.C.

(57) ABSTRACT

A method for setting a lip region of a face included in an image, including setting a first region and a second region in an image including a face, identifying contrast information of the first region, setting a threshold for binarization using the contrast information, and binarizing the second region based on the threshold. A region in which a pixel having an identical binary value continuously distributed within a predetermined number of ranges in the binarized image is set as an eye candidate object. An eye region is then extracted from the eye candidate object based on geometric characteristic of an eye region in an image, and the lip region is set with reference to the extracted eye region based on geometric information of the eye region and the lip region.

12 Claims, 5 Drawing Sheets

METHOD AND APPARATUS FOR SETTING A LIP REGION FOR LIP READING

This application claims priority under 35 U.S.C. §119(a) to a Korean Patent Application filed in the Korean Industrial Property Office on Jan. 2, 2009 and assigned Serial No. 10-2009-0000124, the content of which is incorporated herein by reference.

BACKGROUND OF THE INVENTION

1. Field of the Invention

The present invention relates generally to image recognition technology, and more particularly, to a method and an apparatus for detecting a lip region for lip reading of an image including a face.

2. Description of the Related Art

Conventional speech recognition technology uses a voice signal such that there is a problem in that ambient noise affects recognition performance. In order to solve such a problem, technology for recognizing voice using image information of the lips, tongue, teeth, etc., of a speaker included in an image, i.e., lip-reading or Visual Speech Recognition (VSR) technology, is currently being researched and developed.

A sequence for processing an image signal for the lip-reading includes detecting a lip region and extracting a lip characteristic.

For detecting the lip region, information of a center point, width, height, etc., of the lips of the speaker is detected from an entire image of the input signal based on color information. According to the conventional detection of the lip region, a face region included in the image is detected based on the color information and then the lip region is detected within the detected face region. Such a detection of the lip region uses geometric information of the face or is implemented based on color information of the lip.

However, a color or contrast of a face varies according to the skin color of a person and also varies according to a race, such that it is difficult to detect the face region on a basis of the collective color. Further, illumination changes cause will change the color information such that the performance for detecting the face region is greatly deteriorated. In particular, illumination is more seriously changed in the use environment of a mobile communication terminal that is not usually used within a predetermined place such that the performance for detecting the face region based on the color information is greatly deteriorated. In this respect, if the image signal is processed for lip-reading in the mobile communication terminal, there is a problem of great deterioration of the performance for detecting the face region.

SUMMARY OF THE INVENTION

The present invention has been made to solve at least the above-described problems occurring in the prior art and provide at least the following advantages.

An aspect of the present invention is to provide a method and an apparatus for accurately detecting a lip region for lip reading, based on a location of an eye, while taking into consideration a use environment of a mobile communication terminal.

In accordance with an aspect of the present invention, there is provided a method for setting a lip region of a face included in an image. The method includes setting at least a predetermined first region and a predetermined second region in an image including a face; identifying contrast information of the predetermined first region; setting a threshold for binarization using the contrast information; binarizing the predetermined second region based on the threshold; setting a region in which a pixel having an identical binary value is continuously distributed within a predetermined number of ranges in the binarized image as an eye candidate object; extracting an eye region from the eye candidate object with considering geometric characteristic of an eye region in an image; and setting a lip region with reference to the extracted eye region based on geometric information of the eye region and the lip region.

In accordance with another aspect of the present invention, there is provided an apparatus for setting a lip region of a face included in an image. The apparatus includes a reference region setting unit for receiving an input of an image including a face and setting at least a predetermined first region and a predetermined second region from the image; a binarization threshold setting unit for identifying contrast information of the predetermined first region set by the reference region setting unit and setting a threshold for binarization using the contrast information; a binarization operation unit for binarizing the predetermined second region based on the threshold; an eye candidate object extraction unit for setting a region in which a pixel having an identical binary value is continuously distributed within a predetermined number of ranges in the binarized image as an eye candidate object; an eye region extraction unit for extracting an eye region from the eye candidate object with considering geometric characteristic of an eye region in an image; and a lip region extraction unit for setting a lip region with reference to the extracted eye region based on geometric information of an eye region and a lip region.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
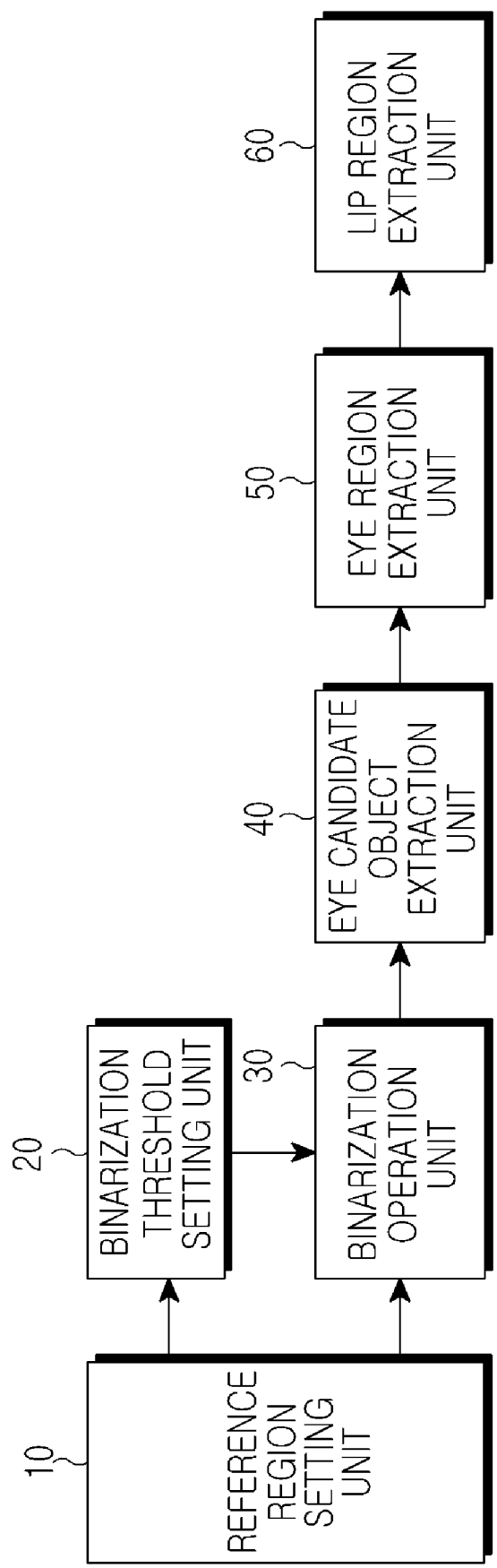
FIG. 1 is a block diagram schematically illustrating an apparatus for setting a lip region according to an embodiment of the present invention.

Hereinafter, certain embodiments of the present invention will be described with reference to the accompanying drawings. In the following description, the same elements will be designated by the same reference numerals although they are shown in different drawings. In the following description, a detailed explanation of known related functions and constitutions may be omitted to avoid unnecessarily obscuring the subject matter of the present invention.

According to an embodiment of the present invention, an apparatus is provided for setting a lip region applied to a mobile communication terminal for use in different environments.

Generally, a face of a user is present in an image photographed by a camera and the face of the user is positioned at a center of an obtained image. On an assumption of these two points, it is possible to present a simple scenario for lip reading using a mobile communication terminal. Specifically, when the face positioned in an expected region of an obtained image, the apparatus for setting a lip region uses a characteristic of the face that is easily found in a given narrow region of the image.

FIG. 1 is a block diagram of an apparatus for setting a lip region according to an embodiment of the present invention.

Referring to FIG. 1, the apparatus includes a reference region setting unit 10, a binarization threshold setting unit 20, a binarization operation unit 30, an eye candidate object extraction unit 40, and an eye region extraction unit 50, and a lip region extraction unit 60.

Figure 2:
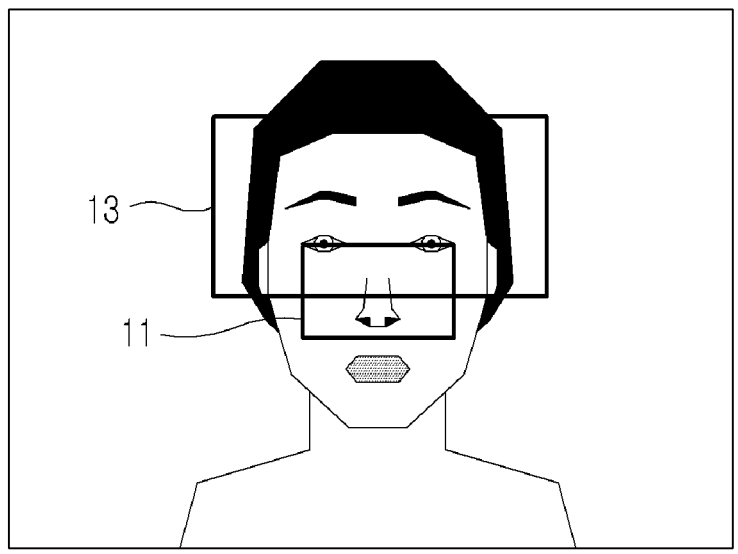
FIG. 2 is a diagram illustrating a first region and a second region set by a reference region setting unit included in an apparatus for setting a lip region according to an embodiment of the present invention.

The reference region setting unit 10 receives an input of an image, including a face, and estimates a pixel of a predetermined range of the region in which the face can be present within the image, i.e., the center part of the image, as a face region, based on a size, ratio, etc., of the image. Then, the reference region setting unit 10 sets at least two regions (e.g., a first region 11, as illustrated in FIG. 2, and a second region 13, as illustrated in FIG. 2) in the estimated face region, based on geometric information of the face. The first region 11 is a region in which a skin color of the face is concentratively distributed, e.g., a region expected to include a nose of the face. The first region 11 may be a pixel of a predetermined range from a center point of the image. The predetermined range of the first region 11 can be set in a size of a plurality of regions divided from the image. For example, the size of the first region 11 can be set in a size of a single cell generated by dividing the image into 9 rows and 16 columns. The second region 13 is a region expected to include an eye of the face, and for example, may be a predetermined range of a region located in an upper part relatively higher than the first region 11. The predetermined range of the second region 13 can be set in a size of a cell generated by dividing the image, for example, into 4 rows and 3 columns. The position of the nose and eye included in the face in the first and second regions 11 and 13 can be set based on a value obtained through standardizing the position of the nose and eye in multiple images including a face.

The binarization threshold setting unit 20 identifies contrast information of the first region 11 and sets a threshold for binarization using the light and shape information. In accordance with an embodiment of the present invention, the binarization threshold setting unit 20 sets the threshold for binarization by calculating a mid-value of a contrast value of the pixels included in the first region 11. For example, the binarization threshold setting unit 20 can calculate the mid-value of the contrast value of pixels included in the first region 11 using Equation (I) below.

$$Thr_e = f(\text{median}(Y)) \quad (1)$$

In Equation (1), $Thr_e$ is a threshold for binarization and Y is a contrast value.

The binarization operation unit 30 performs a binarization operation for the second region 13 based on the threshold $Thr_e$ for the binarization. That is, the binarization operation unit 30 compares the pixels included in the second region 13 with the threshold $Thr_e$ for the binarization. If the contrast value of the pixel included in the second region 13 is equal to or larger than the threshold $Thr_e$ for the binarization, the binarization operation unit 30 sets the value of the pixel as 0, and if the contrast value of the pixel included in the second region 13 is less than the threshold $Thr_e$ for the binarization, the binarization operation unit 30 sets the value of the pixel as 1.

Figure 3:
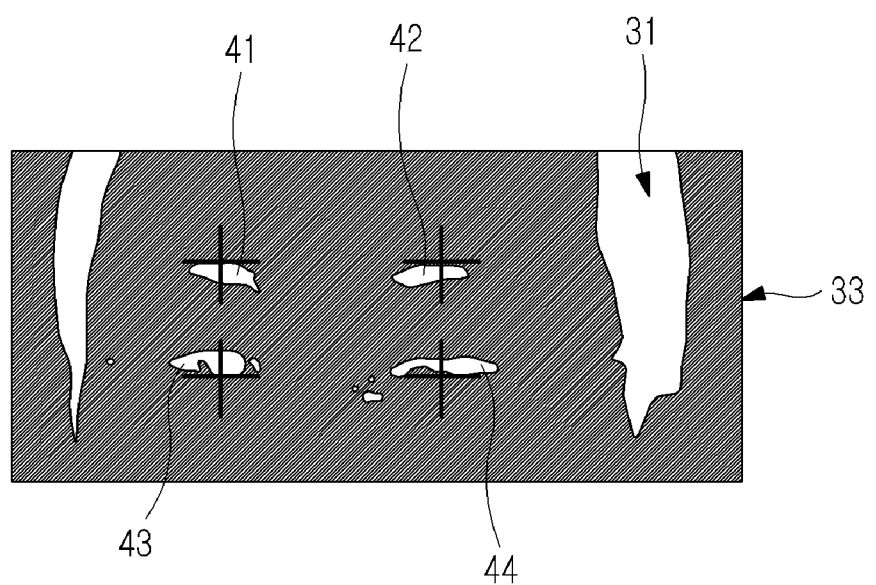
FIG. 3 is a diagram illustrating a binarization operation unit included in an apparatus for setting a lip region according to an embodiment of the present invention.

FIG. 3 is a diagram illustrating a result of a binarization of the second region 13 by the binarization operation unit 30 included in an apparatus for setting a lip region according to an embodiment of the present invention.

Referring to FIG. 3, the pixels 31 that are equal to or larger than the threshold $Thr_e$ for the binarization are set as 0 to be represented in a white color and the pixels 31 that are less than the threshold $Thr_e$ for the binarization are set as 1 to be represented in a color block.

The eye candidate object extraction unit 40 sets a region in which the pixels represented in the white color in the binarized image of the second region 13 are continuously distributed within the predetermined number of ranges as eye candidate objects 41, 42, 43, and 44. For example, the eye candidate object extraction unit 40 sets the region in which 10 to 30 pixels represented in the white color are continuously distributed as the eye candidate object.

The eye region extraction unit 50 extracts a region of a right eye and a left eye based on image information of the pixel of a center part of each object among the eye candidate objects. The eye region extraction unit 50 establishes a database for the region of the eye from multiple images including a face, presets the Gaussian Mixture Model (GMM) for the database, applies the eye candidate objects to the GMM, calculates a ratio of the eye candidate objects, and searches for a candidate pair having a relatively large ratio.

Figure 4A:
FIG. 4A is a diagram illustrating an eye region detected by an eye region extraction unit included in an apparatus for setting a lip region according to an embodiment of the present invention.

When learning the GMM for the eye region and verifying the eye region, and in order to improve the reliability of the detection of the eye region, the eye region extraction unit 50 extracts and uses a right eye and a left eye (refer to FIG. 4A). Alternatively, in a more proficient method, the eye region extraction unit 50 enlarges the region of the eye brow, as well as the region of the eye, to extract the region including both eyes and eyebrows (refer to FIG. 4B).

The lip region extraction unit 60 searches for a lip candidate region including the lips by considering geometric information between the eyes and lips in the plurality of images including a face, e.g., a distance between two eyes, the shortest distance from a center point of the two eyes to the lips, the width of the lip, etc. Thereafter, the lip region extraction unit 60 extracts the lip region using a histogram, contrast information, color information, etc., of the lip candidate region.

Figure 5:
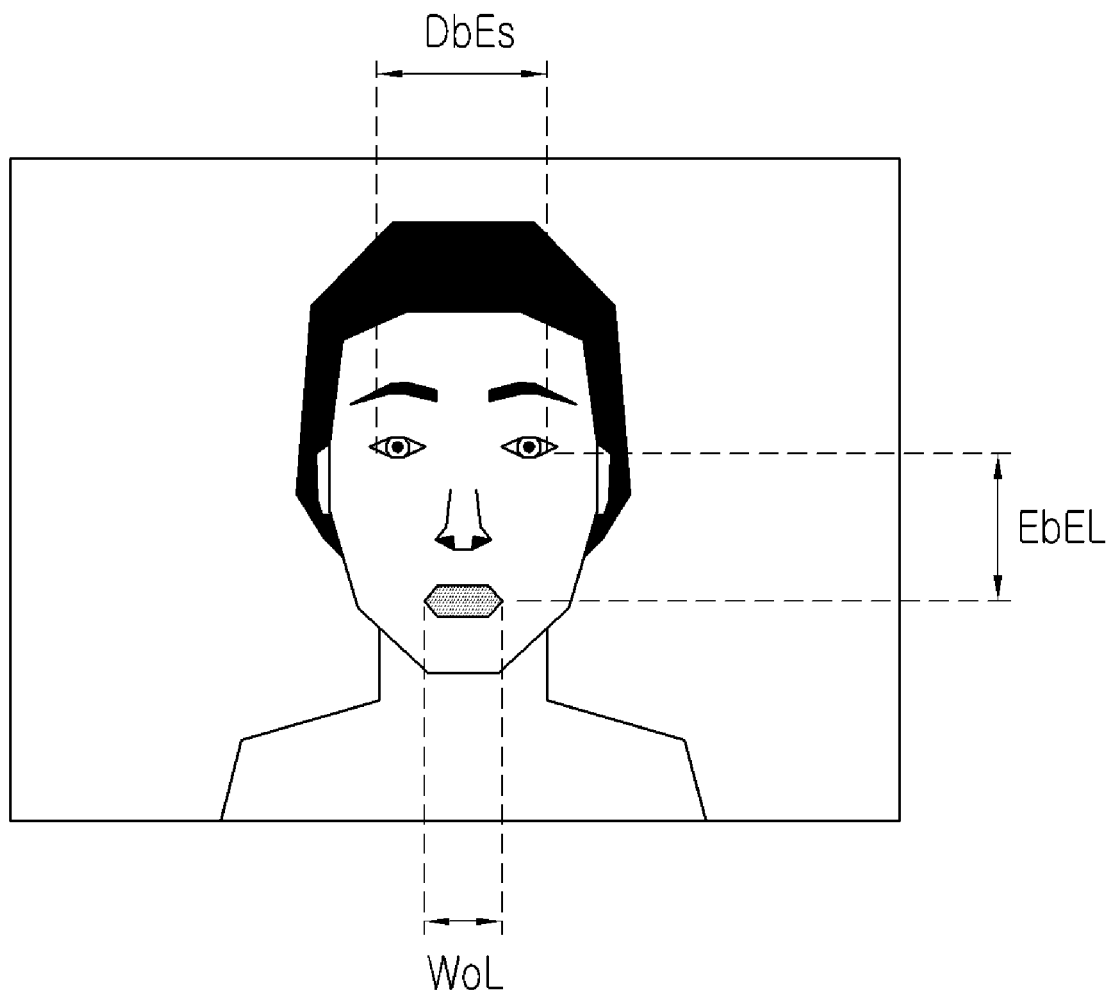
FIG. 5 is a diagram illustrating geometric information between an eye and a lip of an image in an apparatus for setting a lip region according to an embodiment of the present invention.

FIG. 5 illustrates geometric information between eyes and lips of an image in an apparatus for setting a lip region according to an embodiment of the present invention.

Referring to FIG. 5, DbEs represents a distance between two eyes, DbEL represents a shortest distance from a center point of the two eyes to the lips, and WoL represents a width of the lips.

Further, the geometric information between the eyes and lips of the image can be standardized using the relation of DbEs, DbEL, and WoL in a plurality of images. For example, the lip region extraction unit 60 processes an image input from a camera of a mobile communication terminal to which the apparatus for setting a lip region is applied and measures DbEs, DbEL, and WoL, respectively. Further, the lip region extraction unit 60 calculates WoL/DbEs and DbEL/DbEs, respectively. Thereafter, the lip region extraction unit 60 standardizes the geometric information between the eyes and lips based on the calculated value.

Table 1 below represents a result of the maximum value and minimum value obtained through calculating WoL/DbEs and DbEL/DbEs for 28 images input from the camera of the mobile communication terminal to which the apparatus for setting the lip region is applied.

TABLE 1

|  | Maximum value | Minimum value |
|---|---|---|
| WoL/DbEs | 0.9 | 0.48 |
| DbEL/DbEs | 1.51 | 0.95 |

Figure 6:
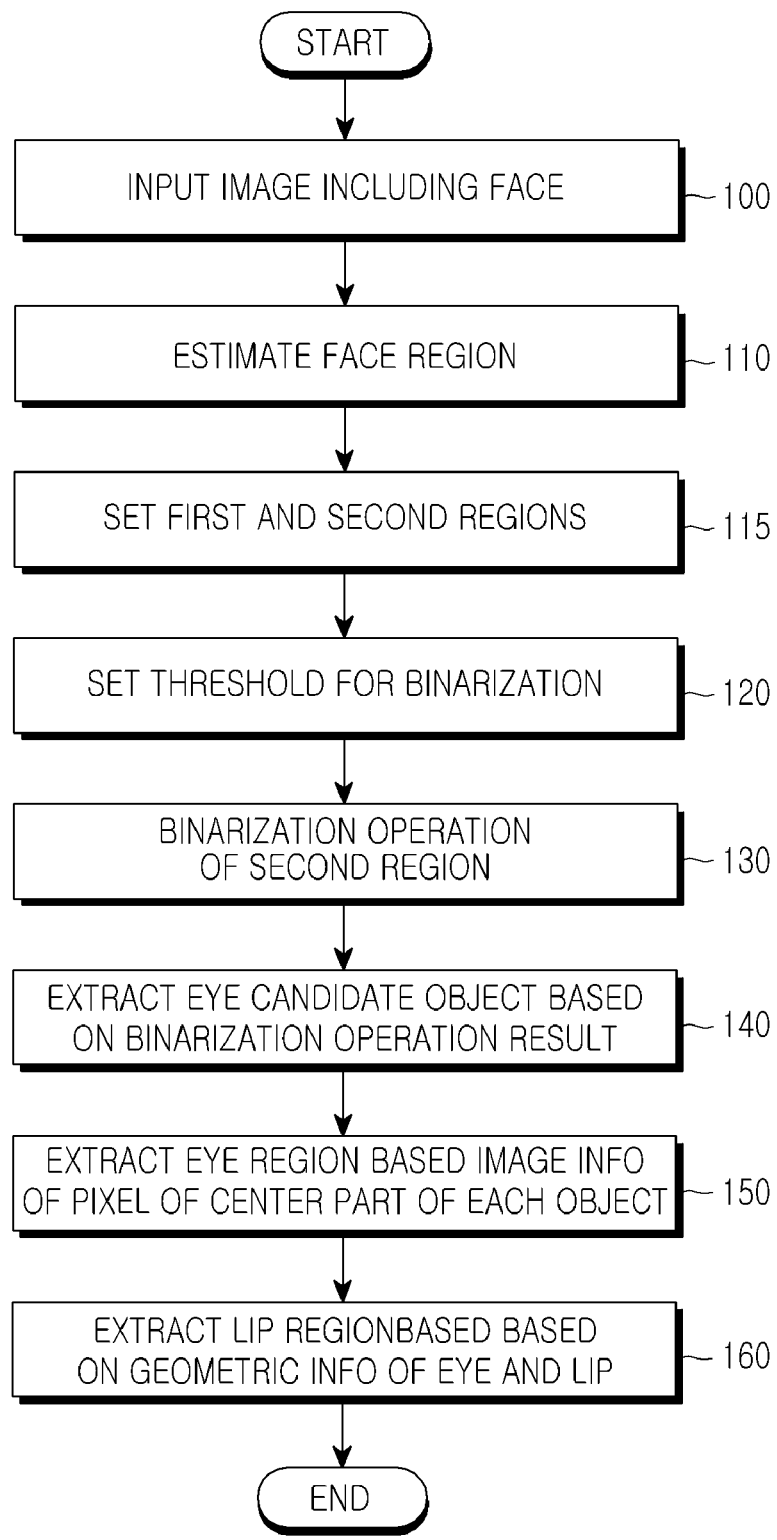
FIG. 6 is a flowchart illustrating a method for setting a lip region according to an embodiment of the present invention.

FIG. 6 is a flowchart illustrating a method for setting a lip region according to an embodiment of the present invention.

Referring to FIG. 6, in step 100, if an image including a face is input in the reference region setting unit 10, the reference region setting unit 10 estimates a pixel of a predetermined range of the region in which the face can be present within the image, i.e., the center part of the image, as a face region based on a size, ratio, etc., of the image in step 110.

In step 115, the reference region setting unit 10 sets at least two regions (e.g., the first region 11 and the second region 13, as illustrated in FIG. 2) in the estimated face region based on geometric information of the face. As described above, the first region 11 is a region in which a color of the skin of the face is concentratively distributed, e.g., a region expected to include a nose of the face. The first region 11 may be defined by a pixel of a predetermined range from a center point of the image. The predetermined range of the first region 11 can be set in a size of a plurality of regions divided from the image. For example, the size of the first region 11 can be set in a size of a single cell generated by dividing the image into 9 rows and 16 columns. The second region 13 is a region expected to include eyes of the face, and for example, may be a predetermined range of a region located in an upper part relatively higher than the first region 11. The predetermined range of the second region 13 can be set in a size of a cell generated by dividing the image into 4 rows and 3 columns. The position of the nose and eye included in the face in the first and second regions 11 and 13 can be set based on a value obtained through standardizing positions of the nose and eyes in a plurality of images including a face.

In step 120, the binarization threshold setting unit 20 identifies contrast information of the first region 11 and sets a threshold for binarization using the light and shape information. In accordance with an embodiment of the present invention, the binarization threshold setting unit 20 sets the threshold for binarization through calculating a mid-value of a contrast value of the pixels included in the first region 11. The threshold for binarization can be set through the operation of Equation (1), as described above.

In step 130, the binarization operation unit 30 performs a binarization operation for the second region 13 based on the threshold $Thr_e$ for the binarization. That is, the binarization operation unit 30 compares the pixels included in the second region 13 with the threshold $Thr_e$ for the binarization. If the contrast value of the pixel included in the second region 13 is equal to or larger than the threshold $Thr_e$ for the binarization, the binarization operation unit 30 sets the value of the pixel as 0, and if the contrast value of the pixel included in the second region 13 is less than the threshold $Thr_e$ for the binarization, the binarization operation unit 30 sets the value of the pixel as 1.

In step 140, the eye candidate object extraction unit 40 sets a region in which the pixel represented in the white color in the binarized image of the second region 13 are continuously distributed within the predetermined number of ranges as eye candidate objects 41, 42, 43, and 44. For example, the eye candidate object extraction unit 40 sets the region in which 10 to 30 pixels represented in the white color are continuously distributed as the eye candidate object.

After the eye candidate object is set, the eye region extraction unit 50 extracts a region of a right eye and a left eye, based on image information of the pixel of a center part of each object among the eye candidate objects in step 150. The eye region extraction unit 50 presets the GMM for a region of the eyes of a plurality of images including a face and stores the GMM in memory. Accordingly, when step 150 is performed, the eye region extraction unit 50 applies the eye candidate objects to the GMM and calculates a ratio of the eye candidate objects. Further, the eye region extraction unit 50 searches for a candidate pair having the relatively large ratio and extracts the candidate pair as the eye region.

Figure 4B:
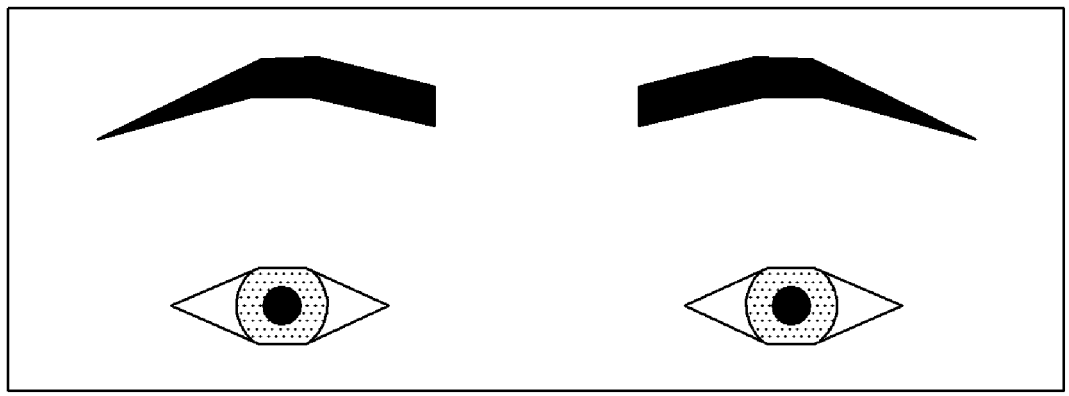
FIG. 4B is another diagram illustrating an eye region detected by an eye region extraction unit included in an apparatus for setting a lip region according to an embodiment of the present invention.

Further, in order to improve the reliability on the detection of the eye region, it is the eye region extraction unit 50 extracts a right eye region and left eye region, based on the geometric information of the face including the right and left eyes, as illustrated in FIG. 4A. Alternatively, the eye region extraction unit 50 enlarges the region of the eye brow, as well as the region of the eye, to extract the region including both eyes and eyebrows, as illustrated in FIG. 4B.

The lip region extraction unit 60 searches for a lip candidate region including the lips based on the eye region extracted in step 150 by considering geometric information between the eyes and lips in a plurality of images including a face, e.g., a distance between two eyes, a shortest distance from a center point of the two eyes to the lips, a width of the lips, etc. In step 160, the lip region extraction unit 60 extracts the lip region using a histogram, contrast information, color information, etc., of the lip candidate region.

The method and apparatus for setting a lip region according to the above-described embodiments of the present invention can be utilized in a mobile communication terminal. The method and apparatus for setting the lip region according to the present invention suggests detecting the lip candidate region, without the face detection based, on a color of the face as a pre-processing step of the lip reading, which is resistant to the illumination change. That is, the above-described embodiments of the present invention select the region in which the eyes of the face are sufficiently present, without separately detecting the face region by considering the specific use environment of the mobile communication terminal.

Further, the above-described embodiments of the present invention search for two eyes in a region and determining a lip candidate region sufficiently including the lips in every case using geometric information of the two eyes. This method is resistant against a change of the illumination and face color, which is based on the features of using the contrast information and the non-changing state of the shape of the eye region according to illumination.

Further, the above-described embodiments of the present invention suggest the verification of the two eyes based on a region including the two eyes and eye brows, when verifying the eye region, which is more efficient than a conventional method in which verifying the eye candidate region uses a simple pattern classification method.

Accordingly, the above-described embodiments of the present invention can efficiently detect the face region regardless of the individual difference of the color of the face, a change in the illumination environment, or the like and improve the reliability in detecting the face region.

The apparatus and method for setting the lip region of in accordance with the above-described embodiments of the present invention can be implemented as a computer-readable code in a storage medium readable by a digital apparatus and device. The storage medium readable by a digital apparatus and device includes every kind of storage devices storing data readable by the digital apparatus and system. For example, the storage medium readable by a digital apparatus and device includes ROM, RAM, CD-ROM, magnetic tape, floppy disc, optical disc, or the like, and includes the implementation in the form of the carrier wave (e.g., transmission through Internet). Further, the storage medium readable by a digital apparatus and device is distributed in the digital apparatus and device system connected with the network and stored in the code readable by the digital apparatus and device in a distribution scheme to be executed.

While the present invention has been shown and described with reference to certain embodiments and drawings thereof, it will be understood by those skilled in the art that various changes in form and description may be made therein without departing from the spirit and scope of the present invention, as recited in the attached claims.

What is claimed is:

1. A method for extracting a lip region of a face included in an image, the method comprising the steps of:
    setting at least a first region and a second region in the image including the face, wherein the first region is expected to include a nose region of the face and the second region is expected to include a left eye region and a right eye region;
    identifying contrast information of the first region;
    setting a threshold for binarization using the contrast information;
    binarizing the second region based on the threshold;
    setting a region in which a pixel having an identical binary value is continuously distributed within a predetermined number of ranges in the binarized image as an eye candidate object;
    extracting the left eye region and the right eye region from the eye candidate object based on geometric characteristics of the left eye region and the right eye region in the image;
    setting a lip candidate region with reference to the left eye region and the right eye region based on a distance between the left eye region and the right eye region, maximum and minimum estimated distances from a center point of the left eye region and the right eye region to the lip region, and maximum and minimum estimated widths of the lip region, wherein the lip candidate region is expected to include the lip region of the face; and
    extracting the lip region from the lip candidate region using one of using one of a histogram, contrast information and color information of the lip candidate region.

2. The method as claimed in claim 1, wherein the first region is a region in which a center part of the image is located.

3. The method as claimed in claim 1, wherein the second region is an upper part of the image, relatively higher than the first region.

4. The method as claimed in claim 1, wherein the threshold for binarization is determined according to a mid-value of a contrast value of the first region.

5. The method as claimed in claim 1, wherein the left eye region and the right eye region are extracted based on image information of a center region of the eye candidate object.

6. The method as claimed in claim 1, further comprising:
    identifying image information of the left eye region and the right eye region included in a plurality of images;
    pre-establishing the image information of the left eye region and the right eye region; and
    storing the image information in a memory,
    wherein a Gaussian Mixture Model (GMM) is set and the eye candidate object having a relatively large ratio is extracted as the left eye region and the right eye region, with reference to the stored image information.

7. An apparatus for extracting a lip region of a face included in an image, comprising:
    a reference region setting unit for receiving an input of the image including the face and setting at least a first region and a second region from the image, wherein the first region is expected to include a nose region of the face and the second region is expected to include a left eye region and a right eye region;
    a binarization threshold setting unit for identifying contrast information of the first region set by the reference region setting unit and setting a threshold for binarization using the contrast information;
    a binarization operation unit for binarizing the second region based on the threshold;
    an eye candidate object extraction unit for setting a region in which a pixel having an identical binary value is continuously distributed within a predetermined number of ranges in the binarized image as an eye candidate object;
    an eye region extraction unit for extracting the left eye region and the right eye region from the eye candidate object, based on geometric characteristics of the left eye region and the right eye region in the image; and
    a lip region extraction unit for setting the lip candidate region with reference to the left eye region and the right eye region based on a distance between the left eye region and the right eye region, maximum and minimum estimated distances from a center point of the left eye region and the right eye region to the lip region, and maximum and minimum estimated widths of the lip region, and extracting the lip region from the lip candidate region using one of using one of a histogram, contrast information and color information of the lip candidate region.

8. The apparatus as claimed in claim 7, wherein the first region is a region in which a center part of the image is located.

9. The apparatus as claimed in claim 7, wherein the second region is an upper part of the image, relatively higher than the first region.

10. The apparatus as claimed in claim 7, wherein the binarization threshold setting unit sets the threshold for binarization according to a mid-value of a contrast value of the first region.

11. The apparatus as claimed in claim 7, wherein the eye region extraction unit extracts the left eye region and the right eye region based on image information of a center region of the eye candidate object.

12. The apparatus as claimed in claim 7, wherein the eye region extraction unit identifies image information of the left eye region and the right eye region included in a plurality of images, pre-establishes the image information of the left eye region and the right eye region, stores the image information in a memory, set a Gaussian Mixture Model (GMM) with reference to the stored image information, extracts the eye candidate object having a relatively large ratio as the left eye region and the right eye region.

* * * * *